J. F. ASHLEY.
CULTIVATOR.
APPLICATION FILED APR. 2, 1918.
1,313,242.
Patented Aug. 19, 1919.
2 SHEETS—SHEET 1.
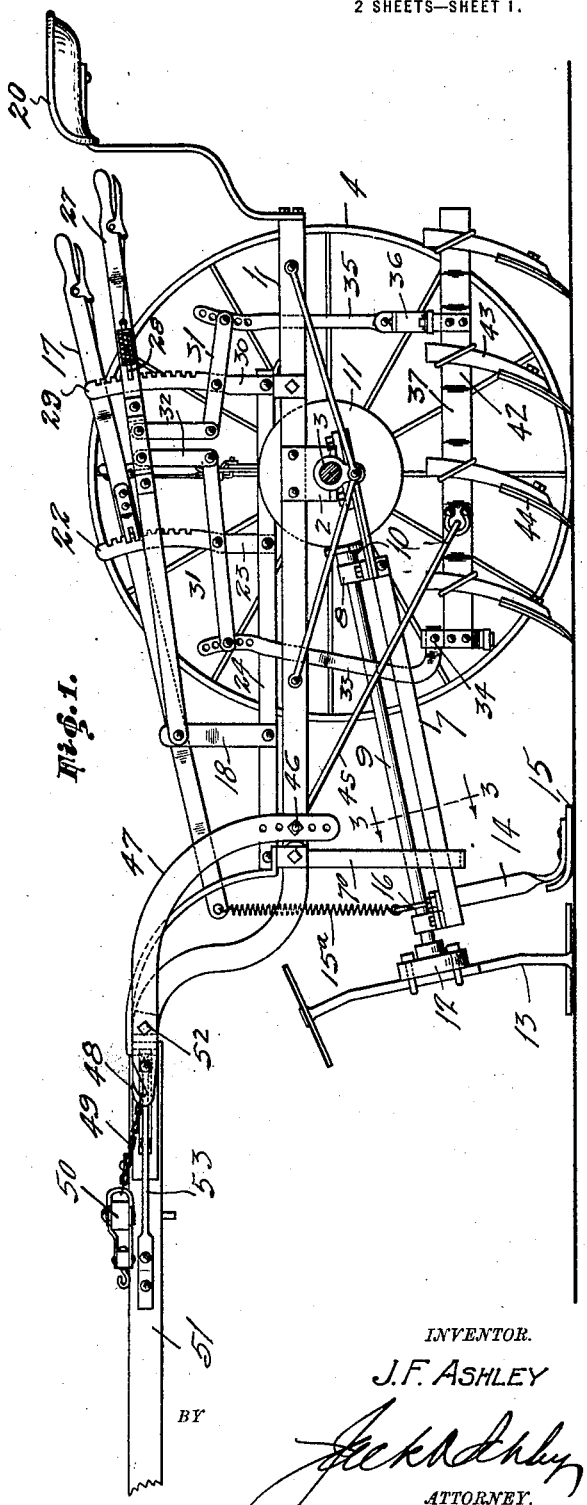
WITNESSES:
INVENTOR.
J. F. ASHLEY
BY
ATTORNEY.

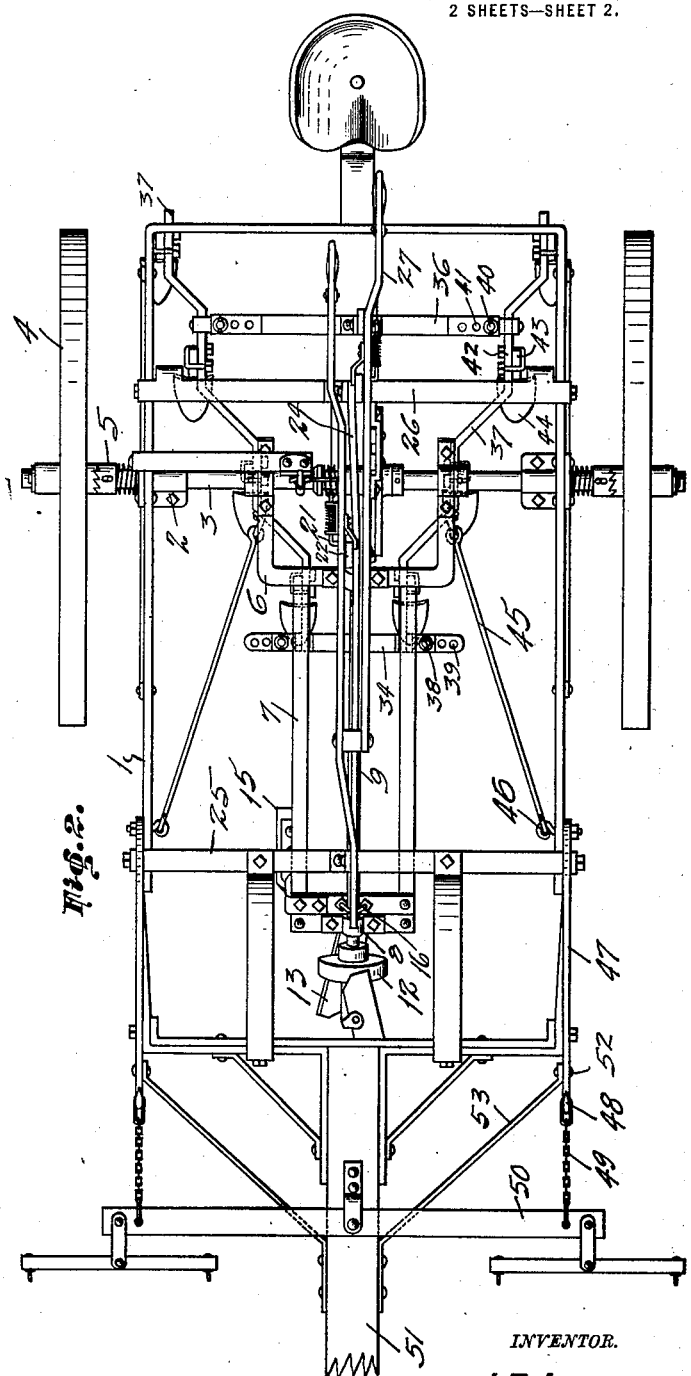

UNITED STATES PATENT OFFICE.

JOHN F. ASHLEY, OF DALLAS, TEXAS.

CULTIVATOR.

1,313,242.   Specification of Letters Patent.   Patented Aug. 19, 1919.

Application filed April 2, 1918. Serial No. 226,153.

*To all whom it may concern:*

Be it known that I, JOHN F. ASHLEY, a citizen of the United States, residing at Dallas, in the county of Dallas and State of Texas, have invented certain new and useful Improvements in Cultivators, of which the following is a specification.

This invention relates to new and useful improvements in cultivating and cotton chopping machines.

The purpose of the invention is to provide means for cultivating and eliminating side draft and so arranging the shovels that each will travel truly in a line of draft substantially parallel to the longitudinal center or correct line of draft; also to provide for a vertical adjustment of the shovels, whereby they may be raised or lowered without disturbing their relative adjustment, but at the same time arranging for a relative adjustment whereby the shovels may be set at different elevations if desired.

In carrying out the invention a rectangular supporting frame is suitably mounted on an axle which is carried in ground wheels. Cultivator beams are suspended by a novel vertical adjusting structure mounted on the supporting frame and are braced by links pivoted to the forward end of the frame. The beams are located on each side of the center and are offset laterally in stepped order so as to provide a plurality of panels parallel with the longitudinal center of the frame and for receiving the cultivator foot fastenings. By this arrangement the shovels will follow in the proper order, but the draft will be reduced to a minimum because the shovels will be set properly in line and not twisted. Various adjustments are provided and will be hereinafter more particularly explained.

The invention will be more readily understood from a reading of the following specification and by reference to the accompanying drawings, in which an example of the invention is illustrated, and wherein Figure 1 is a side elevation of an implement constructed in accordance with this invention, one of the ground wheels being omitted, Fig. 2 is a plan view of the same.

In the drawings the numeral 1 designates a main supporting frame, rectangular in plan and mounted on journal boxes 2 in which a driving axle 3 is journaled. Ground wheels 4 are loosely confined on the axle and engaged by suitable spring clutch devices 5 of the usual construction fastened on said axle.

The parts 18 and 23 are mounted on a longitudinal supporting bar 24 which is supported at its forward end on a cross bar 25, and at its rear end on a cross bar 26, said bars 25 and 26 extending transversely of the frame 1 as shown best in Fig. 2. A hand lever 27 has its forward end pivoted to the post 18 on the opposite side from the lever 17 and carries a locking plunger 28 engaging a locking segment 29 formed on a bar 30, which is also fastened to the bar 24. Toggle levers 31 are pivoted on the bars 23 and 30 and have their adjacent ends pivoted to links 32 which have their upper ends pivoted to the lever 27. It will be seen that the outer ends of the levers 31 will be swung in unison up or down, when the lever 27 is swung. A link 33 has adjustable pivotal connection at its upper end with the front end of the forward lever 31 and is pivoted at its lower end to the center of a transverse arch bar 34; while a second depending link 35 has adjustable pivotal connection at its upper end with the rear end of the rear lever 31 and is centrally pivoted at its lower end to an arch bar 36. The arch bar 34 connects the forward ends of cultivator beams 37. Each beam 37 is connected to the arch bar 34 by a pin 38 which may be engaged in spaced holes 39 in said arch bar, whereby the distance between the beams may be regulated; likewise pins 40 carried by the arch bar 36 may be engaged in holes 41 in the said bar.

Each beam is bent or offset laterally, whereby panels 42 parallel with the longitudinal center of the frame 1 are provided. Each panel in its order rearward is offset laterally away from the center in successive order. To each panel a foot bar 43 is suitably clamped and on each bar 43 the usual shovel 44 is suitably fastened. The panels 42 being flat and in line with the line of draft and the bars 43 being flat and being fastened against said panels it is obvious that the shovels 44 will be fastened in line and not twisted, thus reducing side draft to a minimum. The disposition of the shovels is such as to thoroughly cultivate on each side of the row and their number may be varied. While the beams are shown as level it is understood that by reason of the pivotal adjustment between the links 33 and 35 and the levers 31 the forward ends of the beams may be elevated and the rear ends lowered and any angle necessary obtained. In many cases it would be desirable to have the two forward shovels considerably higher than the rearmost shovels so as to work up close to the plants and at the same time cultivate the furrows. It will be seen that when the lever 27 is swung down the levers 31 will be swung so that the links 33 and 35 will be raised and it is pointed out that both of the links will be raised the same distance so that the relative elevations of the shovels will not be altered. One of the features is that the beams have only a limited lateral swing, and this is due largely to reach rods 45 extending from the beams up to eye bolts 46 at the forward end on each side of the frame 1. When the cultivator mechanism is raised or lowered it will of course swing in an arc which it is free to do. The rods 45 also hold the beams and cause them to work into the ground in line with the draft. Segmental bars 47 have adjustable engagement with the bolts 46 and extend forward and terminate in hooks 48 which are connected by means of chains 49 with a whiffletree 50 mounted on a tongue 51. The forward end of the frame 1 is curved upward and connected with the tongue 51. Angular braces 53 secured to the tongue have their rear end connected with the bars 47 by bolts 52 which form pivot points, whereby the frame 1 may be adjusted by removing the bolts 46 which alters the angular relation between the tongue and said frame.

What I claim; is,

In apparatus of the character described, a wheeled frame, an agricultural implement arranged beneath and near the forward end of the wheeled frame, a cultivator member arranged beneath the rear portion of the wheeled frame, an operator's seat secured to the rear end of the wheeled frame, a single post secured to the forward portion of the wheeled frame and projecting upwardly above the same, an approximately horizontal lever extending above the wheeled frame and pivotally connected with the single post and having its forward end connected with the agricultural implement to raise it and having its rear end terminating near the operator's seat, a second approximately horizontal lever arranged above the wheeled frame and pivotally connected at its forward end with the single post, said second lever extending rearwardly in proximity to the first named lever and terminating near the operator's seat, forward and rear spaced combined uprights and racks secured to the wheeled frame and projecting above the same and arranged between the first and second named levers, approximately horizontal toggle levers pivoted between their ends with the lower portions of the combined uprights and racks, links pivotally connected with the outer ends of the toggle levers and with the opposite ends of the cultivator member, links pivotally connected with the inner ends of the toggle levers and with the second named lever at a point between the combined uprights and racks, a latch carried by the first named lever to engage the forward combined upright and rack, and a latch carried by the second named lever to engage the rear combined upright and rack.

In testimony whereof I affix my signature.

JOHN F. ASHLEY.

Copies of this patent may be obtained for five cents each, by addressing the "Commissioner of Patents, Washington, D. C."